Oct. 14, 1947.  E. SCARDACCIONE  2,429,139
WATCHMAKER'S CALIPERS
Filed Jan. 23, 1945
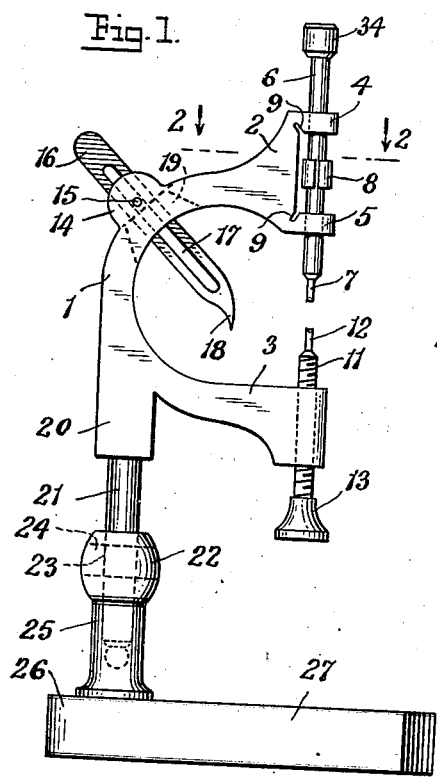
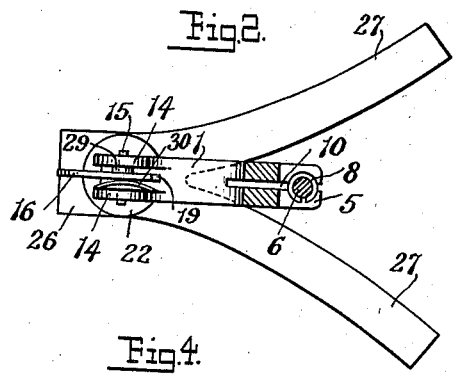
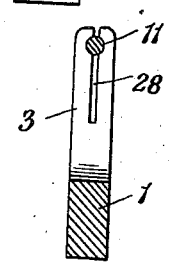
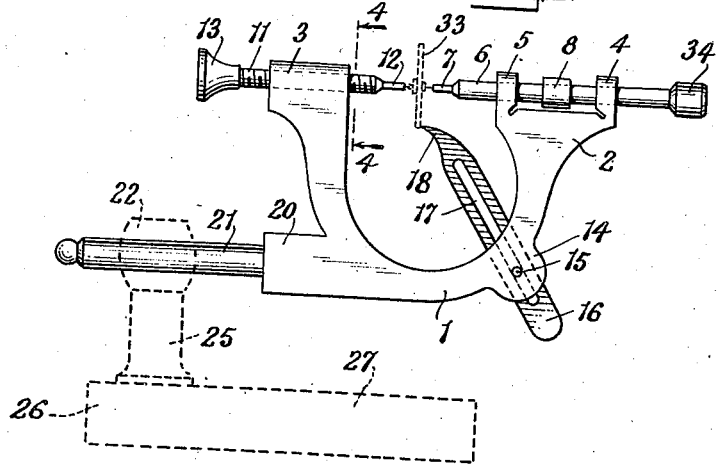
INVENTOR.
Edward Scardaccione
BY
Harry Rozinsky
Attorney Patented Oct. 14, 1947

2,429,139

UNITED STATES PATENT OFFICE 2,429,139

WATCHMAKER'S CALIPER

Edward Scardaccione, Staten Island, N. Y., assignor to Hammel, Riglander & Co. Inc., New York, N. Y., a corporation of New York Application January 23, 1945, Serial No. 574,098

1 Claim. (Cl. 33—143)

This invention relates to a tool for watchmakers, and has for its object the provision of a tool of relatively simple, yet sturdy, construction which has a multitude of uses in the hands of the skilled watchmaker. The tool contemplates the provision of means by which balance staffs may be measured, balance wheels may be trued, and balanced or poised, and various other watchmaking and repair activities greatly aided and simplified.

More particularly, the invention contemplates the provision of a frame having adjustable elements between which a balance wheel may be rotatively supported to determine its accuracy and balance; it contemplates the provision of means by which various measurements required in watchmaking may be taken by the watchmaker; it further contemplates the provision of a supporting device by which the tool may be held in a plurality of positions to greatly facilitate the operations of determining the accuracy and balance of a wheel and its staff; and it enables the watchmaker to simplify and speed up his work with a minimum of effort and to dispense with a plurality of tools now employed in doing the work readily performed by the improved tool.

Other objects are accomplished by the invention hereinafter described and pointed out in the claim appended hereto.

In the accompanying drawing, wherein an embodiment of the invention is disclosed:

Fig. 1 is a side elevation of a tool constructed in accordance with the invention;

Fig. 2 is a sectional view on the line 2—2 of Fig. 1, looking in the direction of the arrows;

Fig. 3 is a side elevation of the tool shown supported in its base or holder in a horizontal position, and as used when determining the balance of a watch balance wheel; and Fig. 4 is a sectional view on the line 4—4 of Fig. 3, looking in the direction of the arrows.

The improved watchmakers' tool is of the combination type. That is to say, it may be used as a measuring instrument or calipers, for ascertaining the length of a balance staff, for example, and for numerous other measuring purposes; it may be used as a poising tool for truing and balancing the balance wheels of watch movements, and for many additional watch-making purposes. In the embodiment shown, the tool includes a frame 1 of substantially C-shape and thus integrally provided with the two arms or jaw portions 2 and 3. The arm 3 is provided with a threaded passage to threadably receive the threaded pin 11, and it is slotted at 28 to enable a relatively slight amount of pressure or friction to be imposed on the threads of the pin 11, causing the pin to hold any set position of adjustment. The pin 11 is formed with a reduced end portion 12, having a conical seat in its end for engagement with the end of a balance wheel staff.

The arm 2 of the frame 1 is divided to form two spaced lug portions or guides 4 and 5, which are each provided with a passage to permit the sliding movement of a stem 6 having a reduced part or tip 7, having a seat in its end for the reception of the end of a balance wheel staff, so that when the two tip portions 7 and 12 are spaced the proper distance apart, the balance wheel, indicated at 33 in Fig. 3, may be held between them and rotated freely to enable it to be poised.

Guide lugs 4 and 5 of the arms 2 are split, as indicated at 10 in Fig. 2, so that they may be arranged to engage the stem 6 with a desired degree of friction to enable the pin to be moved axially through these lugs, but maintained at any set position therethrough by the frictional contact between the stem 6 and the passages in the lugs through which the stem is slidable. To facilitate the frictional contact between the lugs and the stem, slots 9 are also provided in the arm adjacent the lugs. Surrounding the body of the stem 6 between the two lugs 4 and 5 is a split collar 8 which fits the stem with sufficient tightness to enable it to hold any position thereon in which it may be placed, yet to be capable of being manually moved on the stem to act as a stop or gauge member, as will be presently explained.

Assuming that the device is to be used as a caliper or measuring device for ascertaining the length of a balance wheel staff, or the like, one end of the staff is placed against the seat in the tip 12, and then the stem 6 is moved axially to engage the extremity of its tip 7 against the other end of the staff. When this is done, the collar 8 is then slid along the stem 6 until it comes into contact with the lug 5. Then, stem 6 may be raised to release the balance staff, and when the stem 6 is slid downwardly (as viewed in Fig. 1) until the collar 8 again abuts against the lug 5, the spacing then between the ends of the tips 7 and 11 will indicate the length of the balance staff that has been measured. In other words, by setting the collar in position against the lug 5 and allowing the collar to remain in that position, an indication of the spacing between the tips 7 and 12 can be repeatedly had as long as the collar is not manually shifted. The collar is arranged to move rather stiffly on the stem between lugs 4 and 5, so that it will not inadvertently shift its position when the stem is slid through the guide lugs. A head 34 on the stem enables it to be readily slid axially through the guide lugs 4 and 5, and a head 13 on the threaded pin 11 enables the pin 11 to be readily rotated within the arm, yet with a certain amount of friction.

At 14 is shown a pair of spaced ears formed on the frame 1, said ears being connected by a pin 15 on which a feeler or gauge finger 16 is mounted for both pivotal and longitudinal setting. The gauge finger 16 has an elongated slot 17 and a pointed end 18, the latter being directed toward the pin 11 and stem 6 within the frame, so that it may be positioned at the proper location relative to a balance wheel rotatively held between the tips 7 and 12, to act as a gauge to ascertain whether the wheel and the staff are true. The pin 15 extends through the slot 17 in the finger 16 so that the pointed end 18 of the finger may be moved to any extent required, to or from a balance wheel held between the tips 7 and 12. The finger 16 is also pivotally mounted on the pin 15, and to allow of such pivotal movement, the frame 1 is internally slotted as indicated at 19 in Fig. 1. A plate spring 30 located between the ears 14 (Fig. 2) is urged against a face of the finger 16, and holds the opposite face of the finger 16 against a washer 29 on the pin 15, thereby setting up sufficient friction to cause the finger to retain any position in which it may be placed by the user of the tool.

To support the tool in various desired positions while being used, a supporting stand is employed. The same consists of a standard or upright 25 rising from a base 26 formed with divergent arms 27 enabling it to rest firmly upon a table or workbench. The standard is hollow, and terminates in a ball-shaped head 22 which has a vertically-extending aperture 23 into which a rod portion 21 extending from an integral arm portion 20 of the frame 1, extends when it is desired to hold the frame 1 in a vertical position, as shown in Fig. 1, as when poising a balance wheel. The head 22 is also provided with a transverse passage 24 through which the rod 21 may be thrust, as indicated in Fig. 3, when it is desired to support the frame 1 in a horizontal position, or at a time when a balance wheel is being balanced. The ball-shaped head 22 may be split or slotted to divide it into segments which can be forced toward one another, so that the rod 21 will be frictionally gripped between them and firmly held in whichever of the two positions it is inserted.

When the tool is in the position shown in Fig. 1, a balance wheel may be placed between the two supports 6 and 11 and rotated, while the gauge finger determines its trueness and the trueness of the staff. When the tool is in the position of Fig. 3, the balance of a balance wheel supported by it can be readily determined. When the tool is out of the base or support, it can be used as a caliper or other measuring device, as previously explained.

While an effort has been made to herein set forth several of the uses to which the tool may be put by a watchmaker, it will be found to have many uses not herein set forth, and which will readily suggest themselves to the watchmaker confronted with the various repair problems of his trade.

What I claim is:

In a watchmaker's tool, a C-shaped frame having an arm, a threaded stem adjustable through the arm, the frame having a second arm portion provided with spaced ends, the juncture of the body of said second arm with each of said ends being slotted whereby each end can be adjusted as to angularity relative to its companion, each of the spaced ends having a slotted bore, a stem slidable through said slotted bores and frictionally adjustable therethrough to or from the threaded stem, and a split collar slidably adjustable on the slidable stem between the ends of the second arm portion, said collar being confined between said ends and adapted for abutment against either of the spaced ends of the second arm to thereby determine the extent of projection of said slidable stem out of the arm in a direction toward or away from the first stem.

EDWARD SCARDACCIONE.

REFERENCES CITED

The following references are of record in the file of this patent:

UNITED STATES PATENTS

| Number | Name | Date |
|--------|------|------|
| 568,501 | Striker | Sept. 29, 1896 |
| 661,562 | Starrett | Nov. 13, 1900 |
| 715,123 | Nelson | Dec. 2, 1902 |
| 825,648 | Haworth | July 10, 1906 |
| 982,635 | Rogers | Jan. 24, 1911 |
| 1,096,439 | Lucas | May 12, 1914 |
| 1,393,746 | Bushnell | Oct. 18, 1921 |